(No Model.) 12 Sheets—Sheet 1.

J. McKINNON.
ORE CONCENTRATING AND MILLING MACHINE.

No. 582,669. Patented May 18, 1897.

Witnesses
Jas. K. McCathran
V. B. Hillyard

Inventor
John McKinnon
By his Attorneys,
C A Snow & Co.

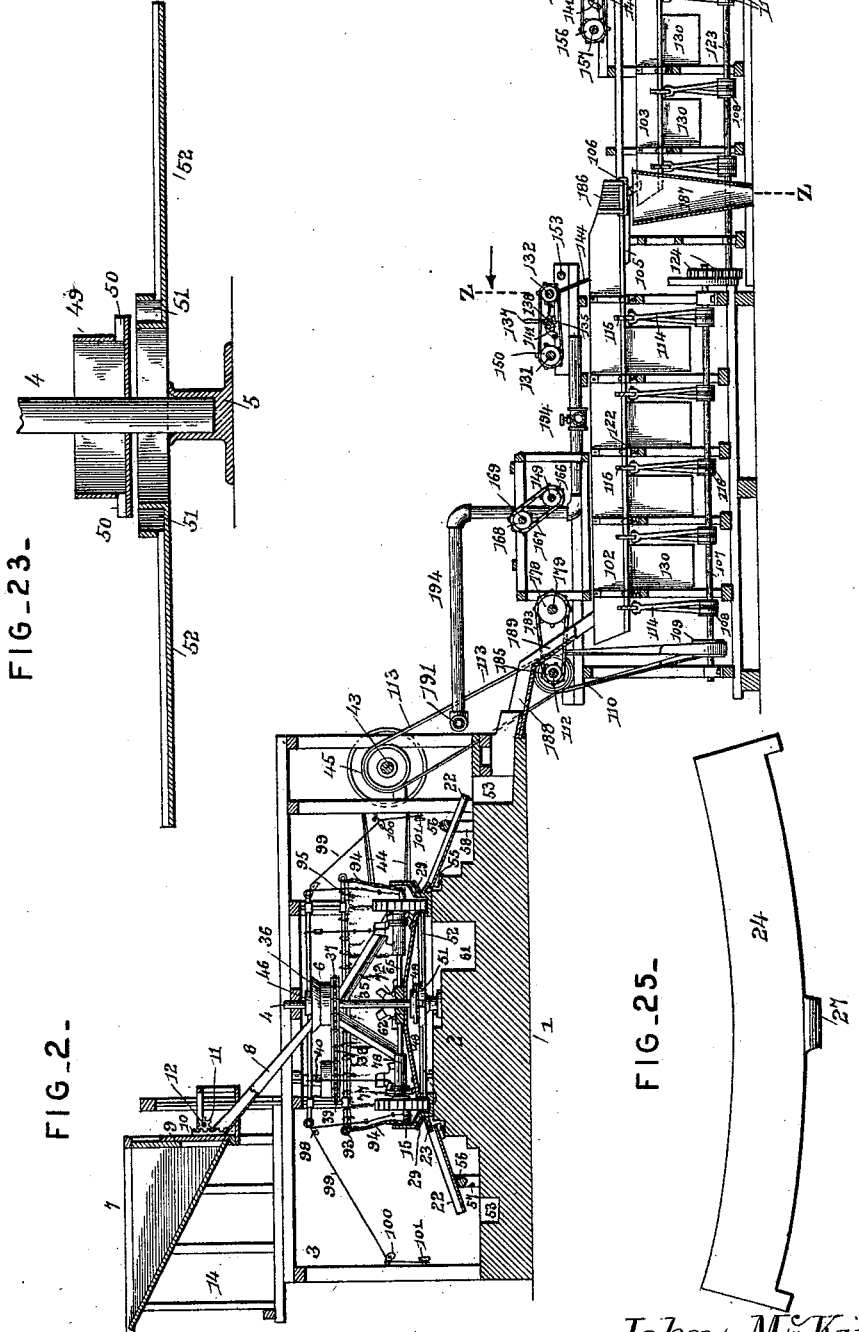

(No Model.)  12 Sheets—Sheet 3.

J. McKINNON.
ORE CONCENTRATING AND MILLING MACHINE.

No. 582,669.  Patented May 18, 1897.

Witnesses
Jas. K. McCathran
V. B. Hillyard.

Inventor
John McKinnon
By his Attorneys,
C. A. Snow & Co.

(No Model.) 12 Sheets—Sheet 4.

J. McKINNON.
ORE CONCENTRATING AND MILLING MACHINE.

No. 582,669. Patented May 18, 1897.

Witnesses
Jas. K. McCathran
V. B. Hillyard

Inventor
John McKinnon
By his Attorneys.
C. A. Snow & Co.

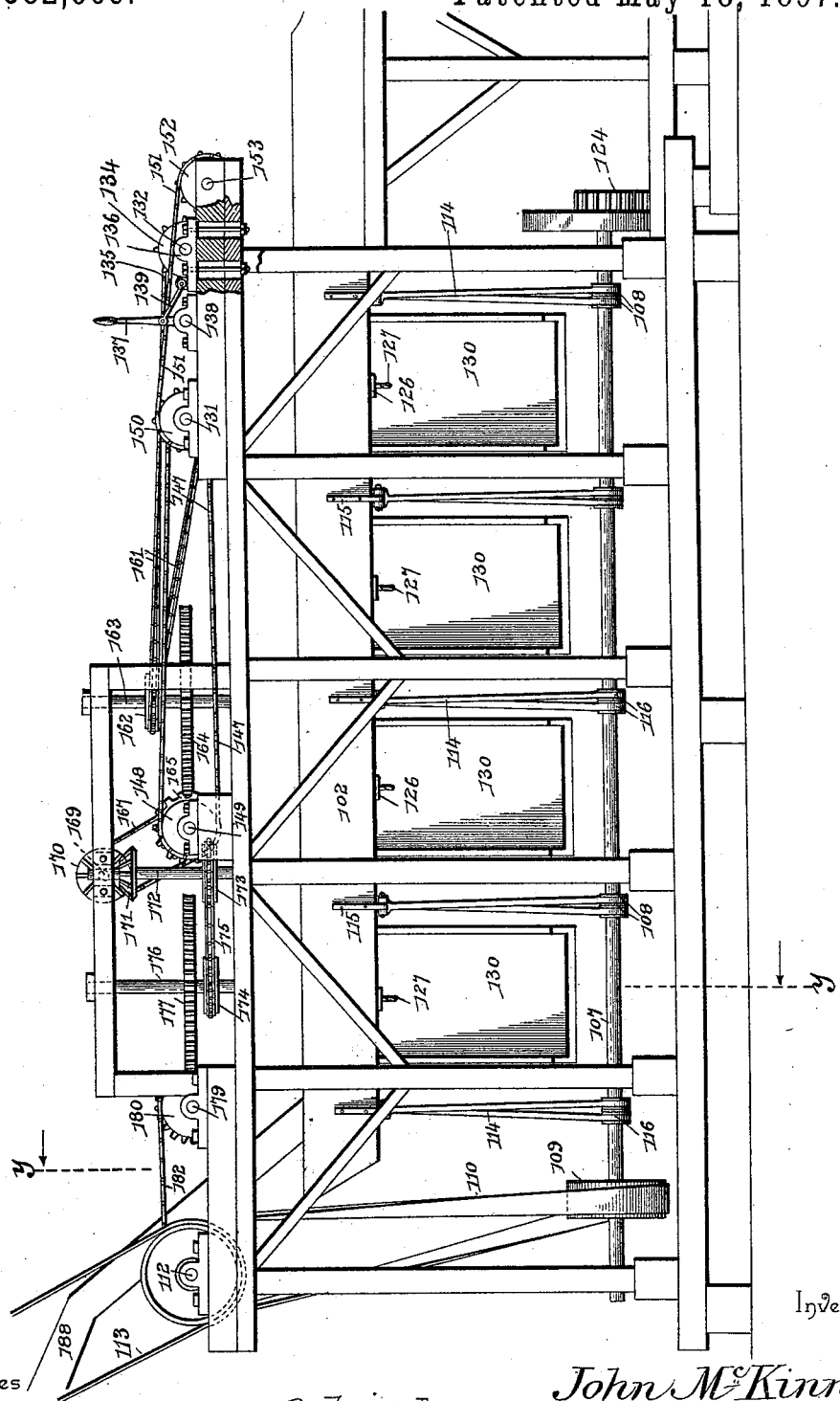

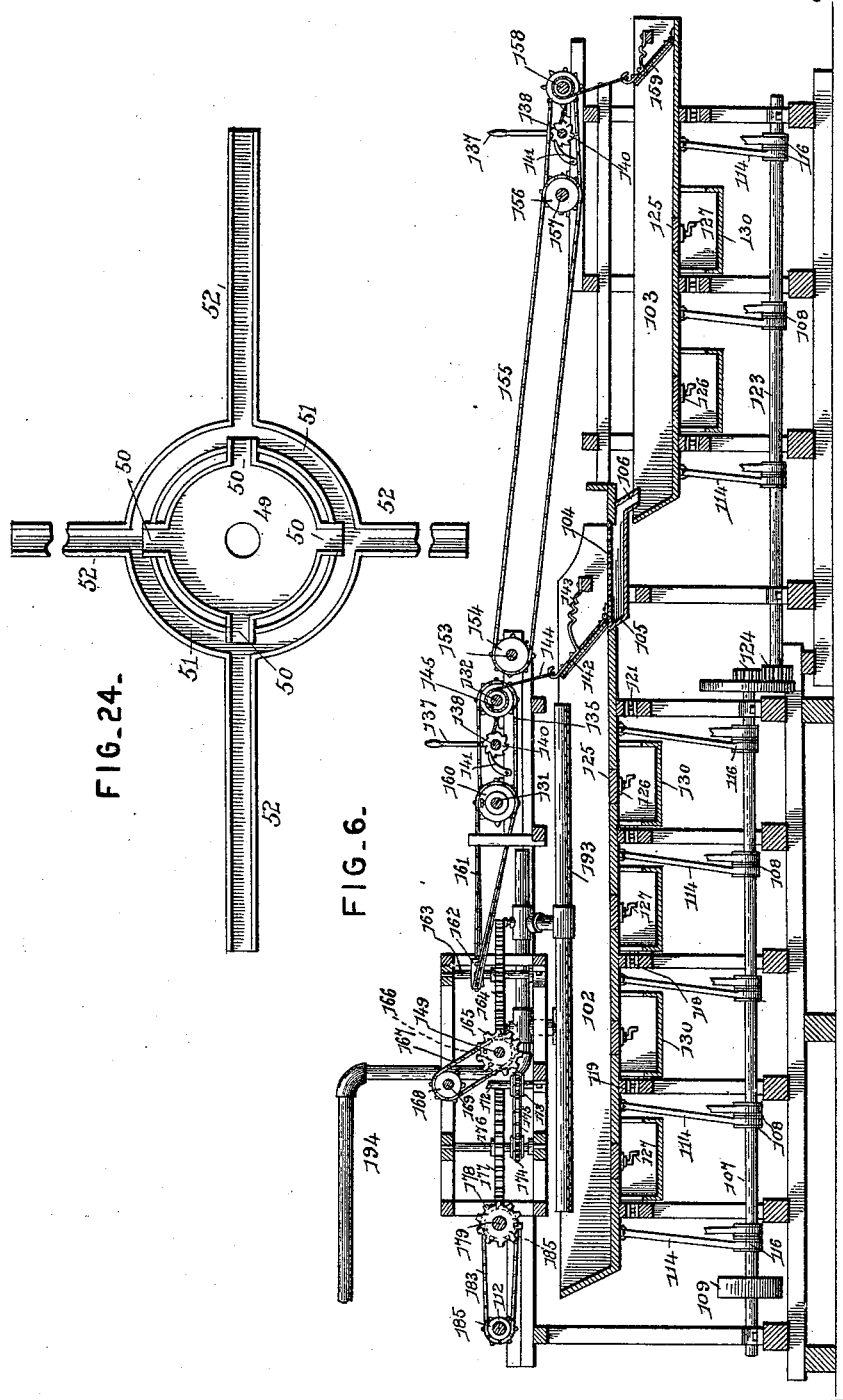

(No Model.) 12 Sheets—Sheet 7.
J. McKINNON.
ORE CONCENTRATING AND MILLING MACHINE.
No. 582,669. Patented May 18, 1897.
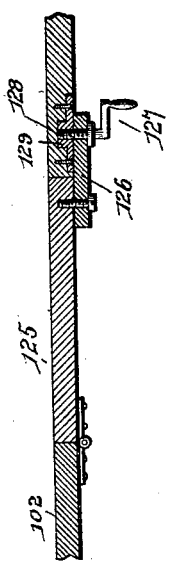
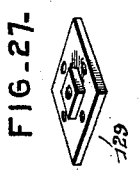
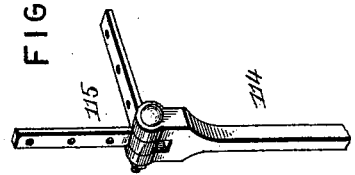
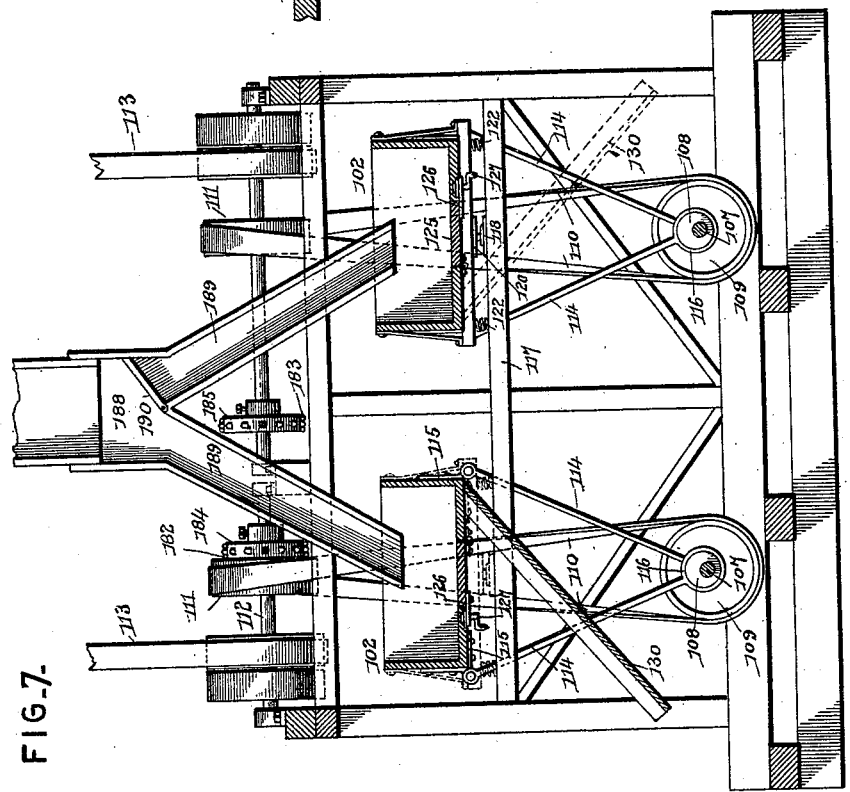
Witnesses
Jas. K. McCathran
V. B. Hillyard
Inventor
John McKinnon
By his Attorneys.
C. A. Snow & Co.
THE NORRIS PETERS CO., PHOTO-LITHO., WASHINGTON, D. C.

(No Model.) 12 Sheets—Sheet 8.

J. McKINNON.
ORE CONCENTRATING AND MILLING MACHINE.

No. 582,669. Patented May 18, 1897.

Witnesses
Jas. K. McCathran
V. B. Hillyard.

Inventor
John McKinnon
By his Attorneys.
C. A. Snow & Co.

(No Model.) 12 Sheets—Sheet 9.
J. McKINNON.
ORE CONCENTRATING AND MILLING MACHINE.
No. 582,669. Patented May 18, 1897.
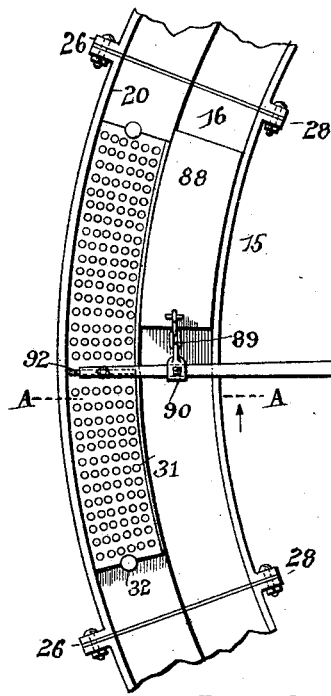
FIG. 10.
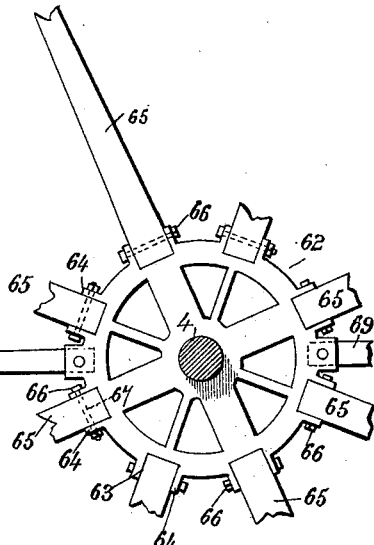
FIG. 11.
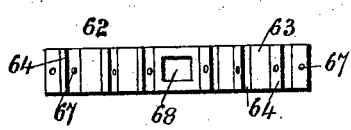
FIG. 12.
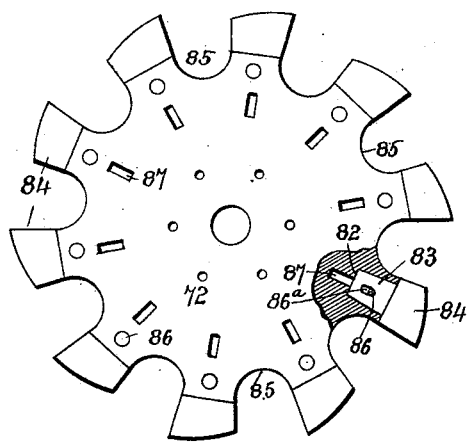
FIG. 15.
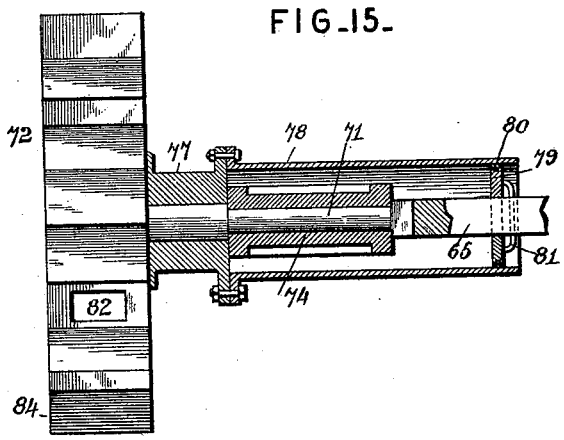
FIG. 16.
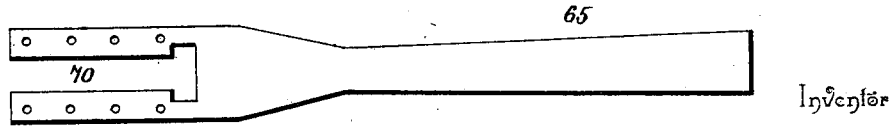
Witnesses
Jas. K. McCathran
V. B. Hillyard
Inventor
John McKinnon
By his Attorneys,
C. A. Snow & Co.

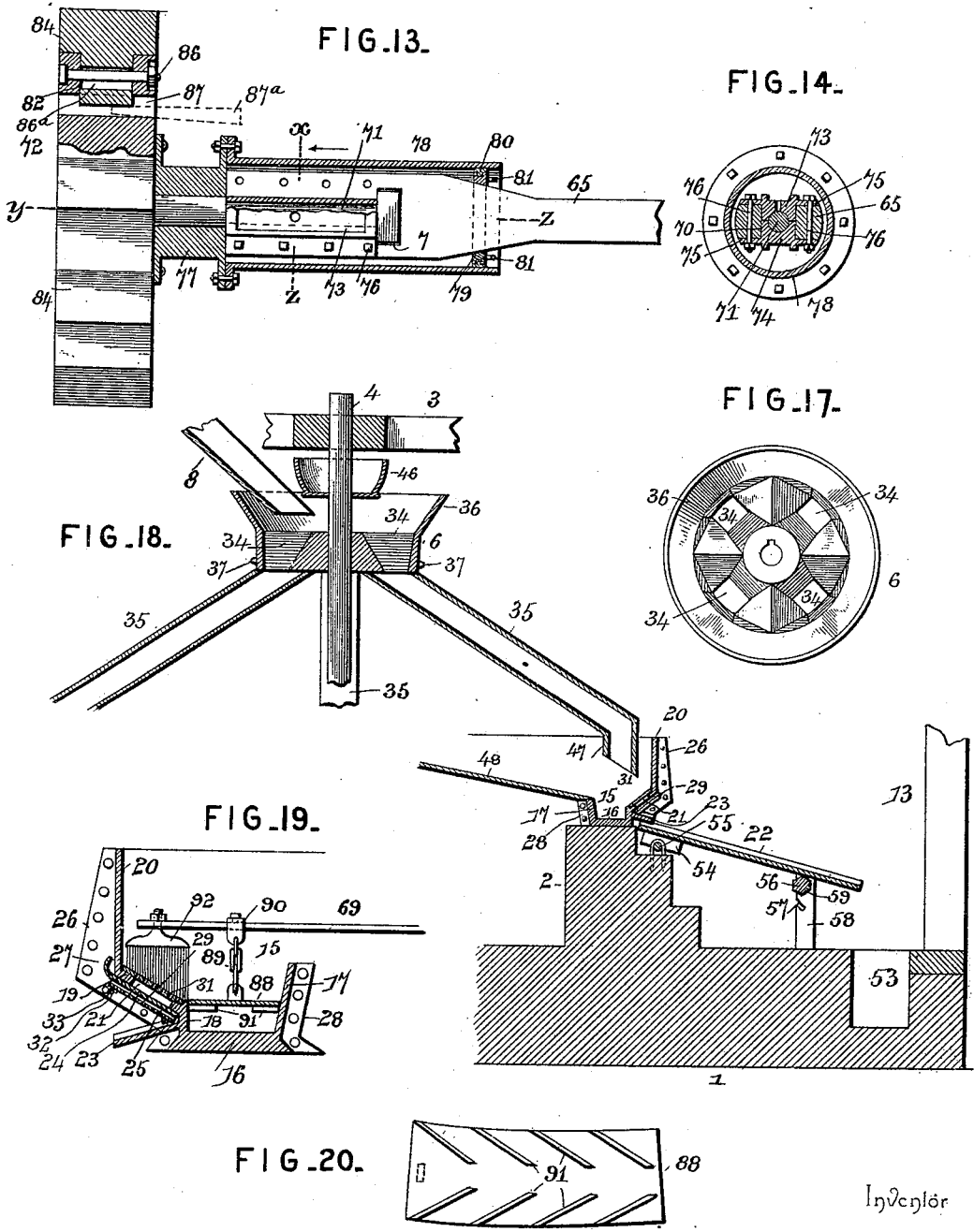

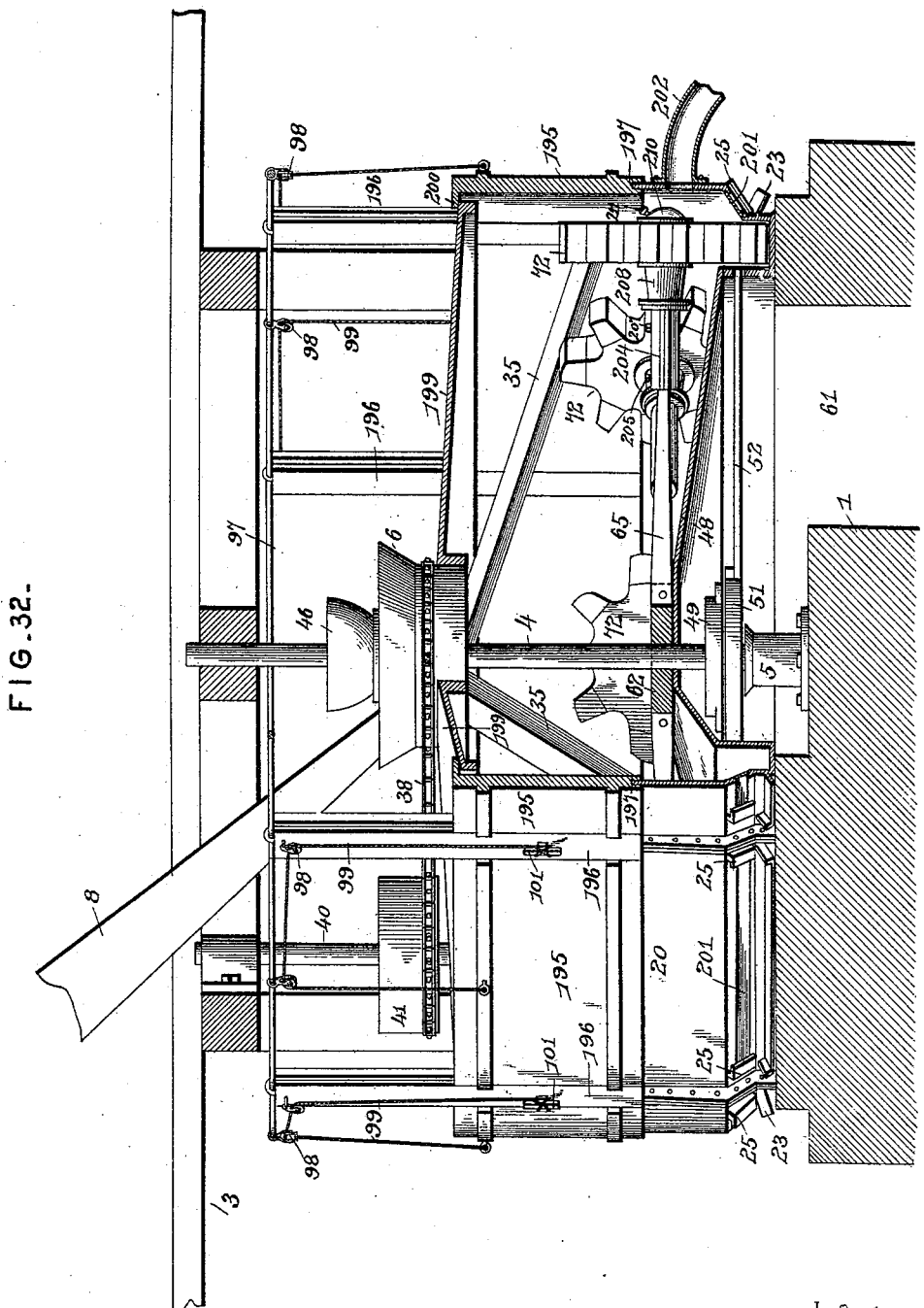

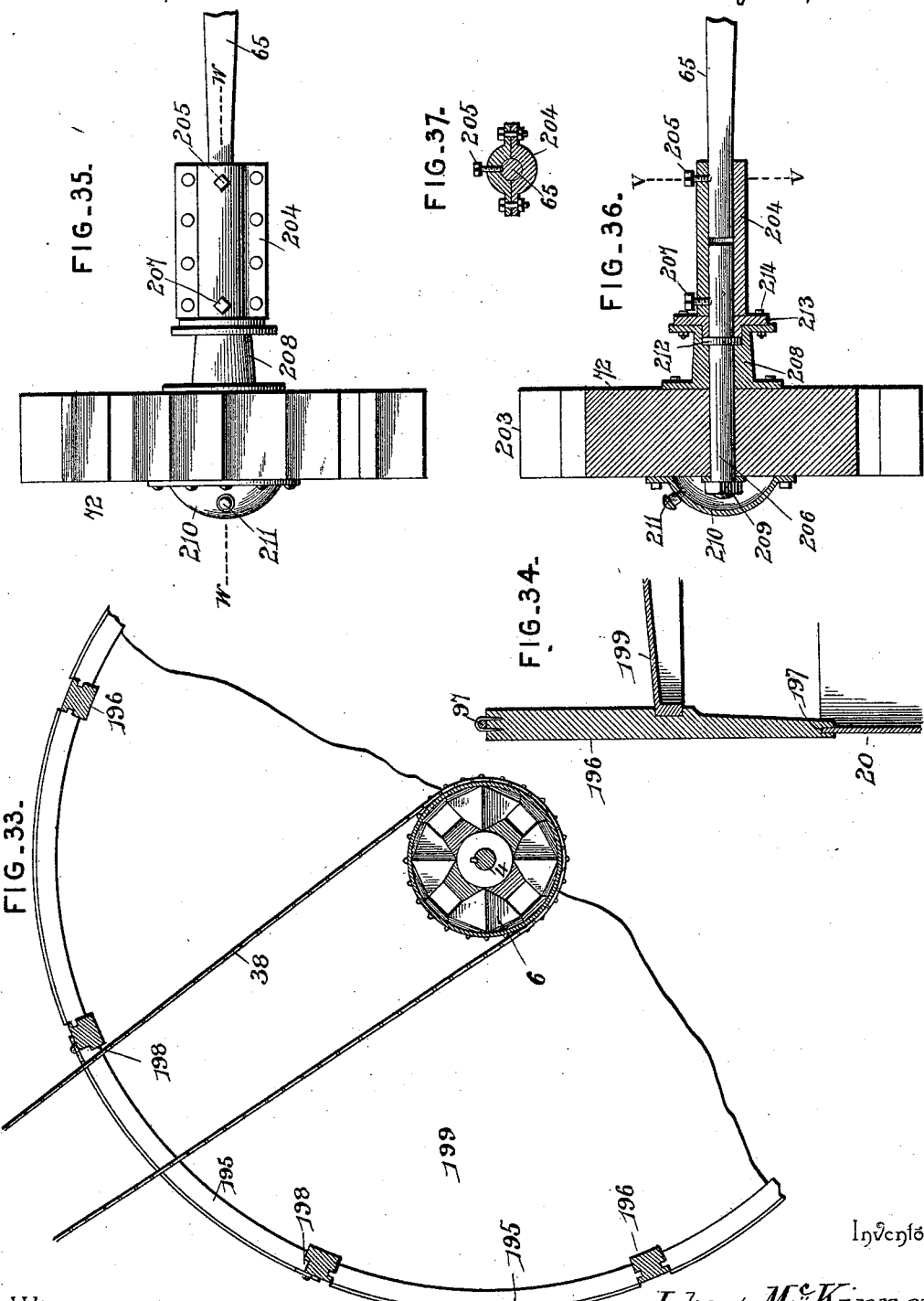

UNITED STATES PATENT OFFICE.

JOHN McKINNON, OF COLFAX, WASHINGTON, ASSIGNOR OF ONE-THIRD TO C. W. PAGE, OF SAME PLACE.

ORE CONCENTRATING AND MILLING MACHINE.

SPECIFICATION forming part of Letters Patent No. 582,669, dated May 18, 1897.

Application filed June 14, 1895. Serial No. 552,844. (No model.)

*To all whom it may concern:*

Be it known that I, JOHN McKINNON, a citizen of the United States, residing at Colfax, in the county of Whitman and State of Washington, have invented a new and useful Ore Concentrating and Milling Machine, of which the following is a specification.

This invention relates to apparatus for pulverizing, milling, and concentrating ores, and has for its object to combine in a single organized structure means for effecting these results in a rapid, efficient, and satisfactory manner, and which at the same time will be under the control of an operator, so that the relative speed of the different parts can be controlled to vary the capacity and working of the apparatus according to the nature of the ore being treated.

Other objects and advantages will appear from the following description and the drawings hereto attached, in which—

Figures 1, 9, 21, 22:
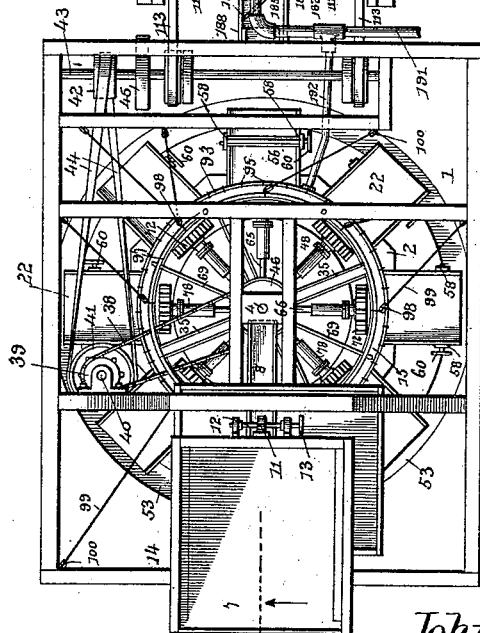
Figure 3:
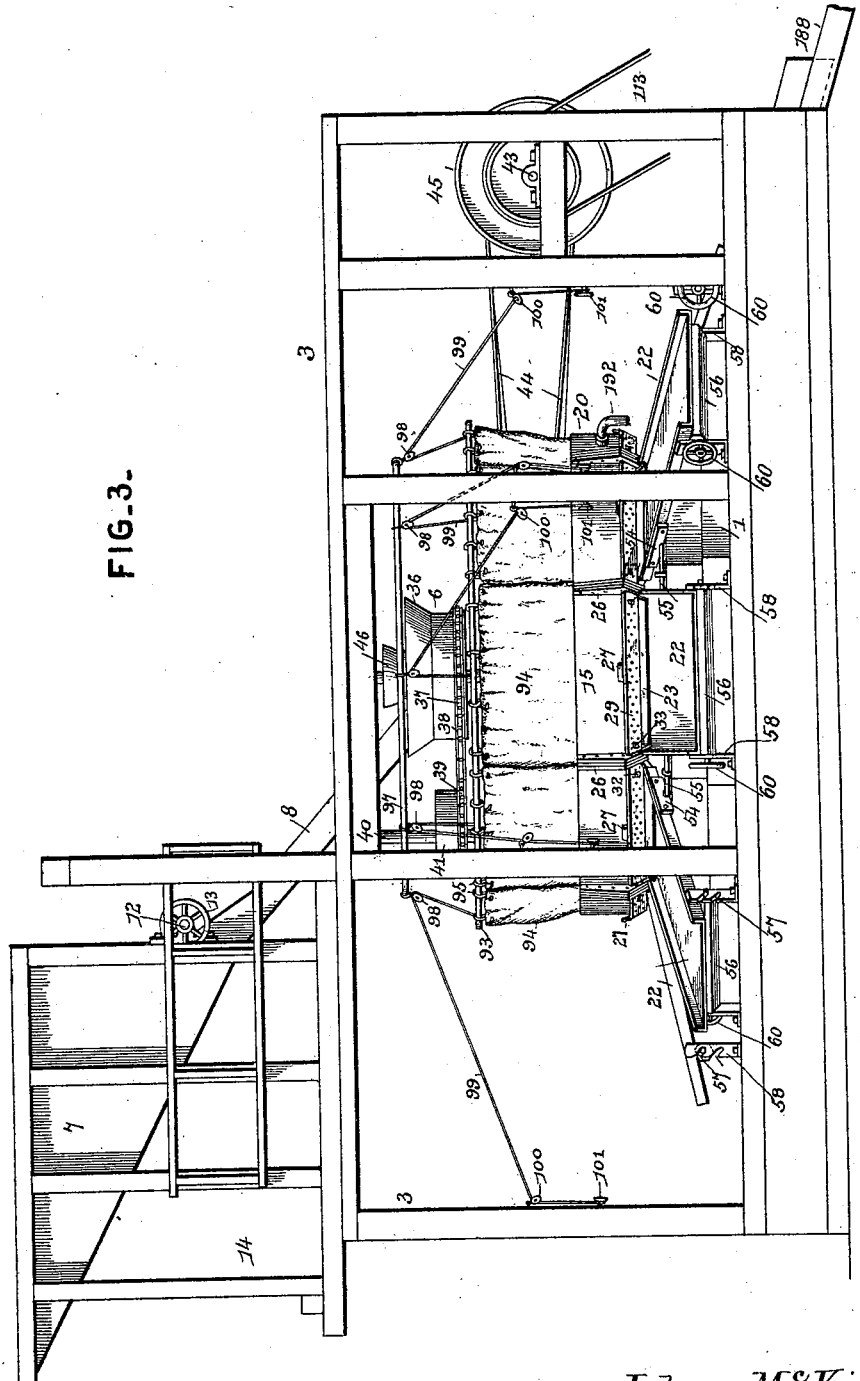
Figure 4:
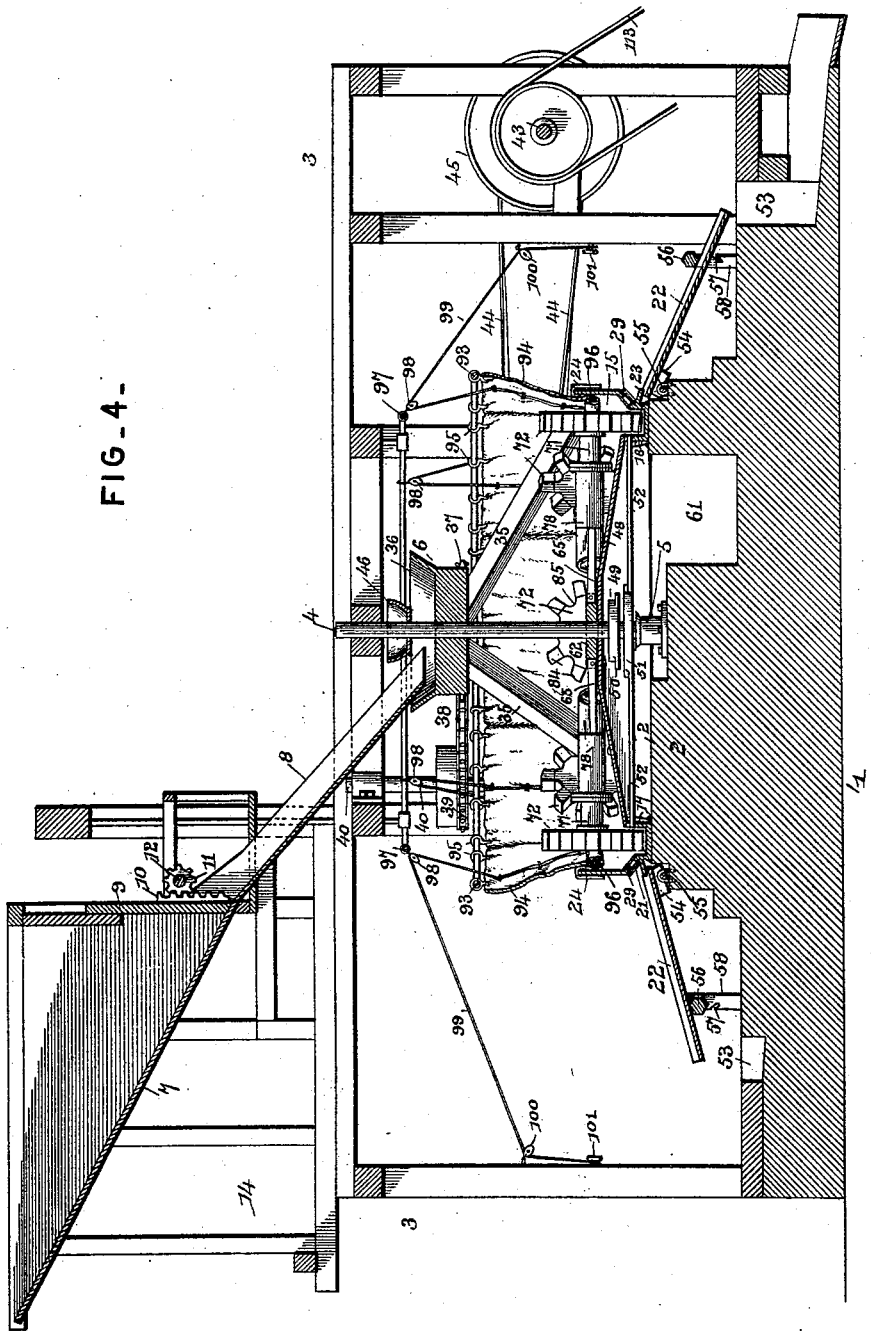
Figure 29:
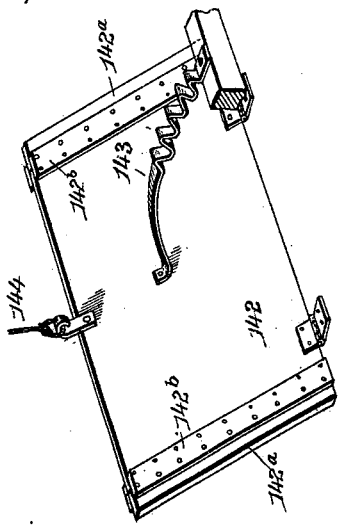
Figure 30:
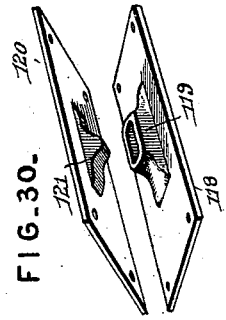
Figure 31:
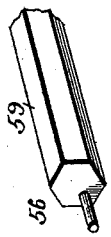
Figure 8:
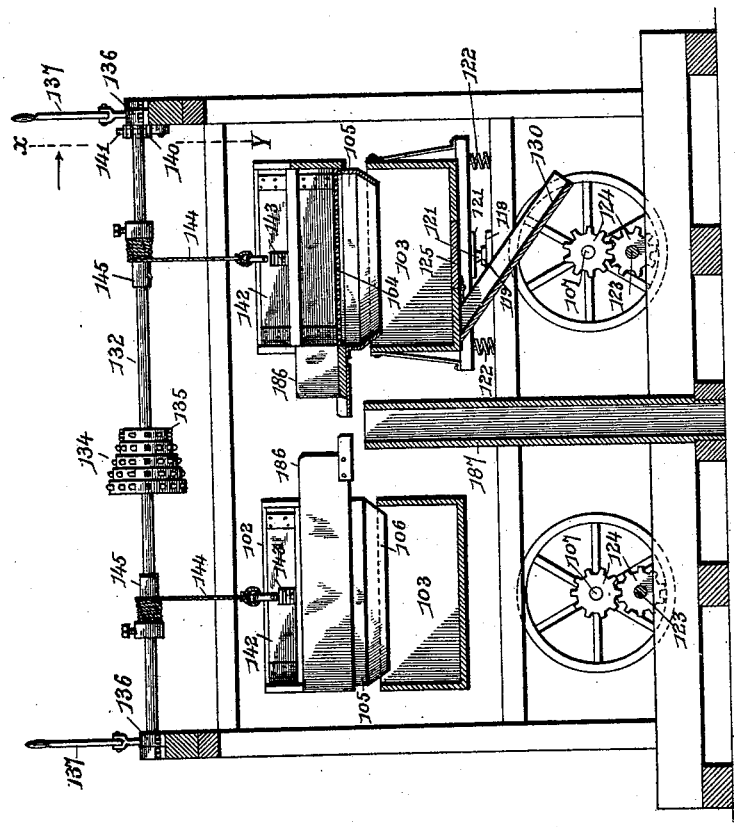

Figure 1 is a top plan view of an apparatus constructed in accordance with and embodying the vital principles of the invention. Fig. 2 is a longitudinal section about on the line X X of Fig. 1. Fig. 3 is a side elevation of that end of the apparatus provided with the ore pulverizing and milling provisions, showing the same on a larger scale. Fig. 4 is a longitudinal section of the parts shown in Fig. 3. Fig. 5 is a side elevation of the upper or first concentrating-pan of the series, showing the framework and the parts connected therewith on a larger scale. Fig. 6 is a longitudinal section of a set of concentrating-pans and the operating parts on a larger scale. Fig. 7 is a section on the line Y Y of Fig. 5, looking in the direction of the arrow. Fig. 8 is a section on the line Z Z of Fig. 2, looking in the direction of the arrow, and shown on a larger scale. Fig. 9 is a detail view in section on the line X Y of Fig. 8, looking to the right, as indicated by the arrow. Fig. 10 is a detail view of a portion of the mortar, showing the relative position of the concentrating-screen, the drag, and the means for operating the pulverizing-wheels, the drag, and the brush. Fig. 11 is an edge view of the hub or casting to which the arms of the pulverizing-wheels are pivotally attached. Fig. 12 is a side elevation of a pulverizing-wheel having a portion broken away, showing the relative disposition of a shoe. Fig. 13 is a top plan view of an arm carrying a pulverizing-wheel, the latter being shown connected therewith and having a portion broken away and showing by dotted lines the tapering key or drift by means of which the shoes are removed from the wheel. Fig. 14 is a cross-section on the line X Z of Fig. 13, looking to the left, the pulverizing-wheel being detached. Fig. 15 is a detail section on the line Y Z of Fig. 13. Fig. 16 is a top plan view of an arm for carrying a pulverizing-wheel. Fig. 17 is a top plan view of a distributing-hopper. Fig. 18 is a detail view of a distributing-hopper, and the parts connected therewith, showing a portion of the mortar, its supporting-bed, base, amalgam plate, and means for adjusting the latter. Fig. 19 is a cross-section on the line A A of Fig. 10, looking in the direction of the arrow. Fig. 20 is a bottom plan view of the drag. Fig. 21 is a top plan view of the free milling-screen. Fig. 22 is a cross-section of the outer portion of the mortar, on a larger scale, showing the relative disposition of the free milling and concentrating screens and showing the cut-off closing the opening in the inclined ledge. Fig. 23 is a detail section of the drip-pan, circular trough, and conveyers provided at the lower end of the vertical shaft. Fig. 24 is a top plan view of the parts shown in Fig. 23, two of the opposite conveyers having an intermediate portion broken away. Fig. 25 is a top plan view of a cut-off to close the opening in the ledge of the mortar. Fig. 26 is a detail section, on a larger scale, of the bottom portion of a concentrating-pan, showing the door therein and the means for fastening the same. Fig. 27 is the plate which is mortised in the concentrator-pan bottom to receive the door-fastening. Fig. 28 shows an angle-iron to be fitted to a corner of a concentrating-pan and to which an operating-arm is pivotally attached. Fig. 29 shows a door at the delivery end of a concentrating-pan. Fig. 30 is a detail view of the rocker-bearing. Fig. 31 is a detail view of the end portion of a roller provided for the adjustment of the amalgam plates. Fig. 32 is a side elevation, partly in section, of a modified form of pulverizer. Fig. 33 is a plan section of a portion of the modification shown in Fig. 32. Fig. 34 is a detail view showing the manner of mounting the deck upon the top edge of the mortar. Fig. 35 is a modified form of stamp-wheel, showing a different means for connecting the same with its operating-arm. Fig. 36 is a section on the line W W of Fig. 35. Fig. 37 is a cross-section on the line V V of Fig. 36.

The base or platform 1 is provided with an elevated bed portion 2, centrally disposed and preferably octagonal-shaped in plan elevation. Upon this base or platform is erected a suitable framework 3, which is designed to hold the operating parts in fixed relative position and provide a support for the bearings of the various shafts.

A vertically-disposed shaft 4 is journaled at its lower end in a step 5, securely fastened to the top side of the elevated bed 2, and is journaled at its upper end in a suitable crossbeam of the framework 3. The ore crushing and pulverizing devices have permanent attachment with and are revolved by the vertical shaft 4, and the distributing-hopper is mounted upon the upper portion of the said shaft 4, so as to revolve therewith. This distributing-hopper 6 will be referred to in detail later on. A hopper 7 is arranged upon one end of the framework 3, and is provided to receive the ore in bulk and supply the same in desired quantities to the distributing-hopper 6 through a chute 8. This hopper 7 has an inclined bottom, and its inner side is provided with an opening which is closed by means of a gate 9, operating vertically across the said opening, being moved by means of a toothed bar 10 and a pinion 11, mounted upon a transverse shaft 12, rotated in its bearings by suitable means, preferably a hand-wheel 13, secured upon one end of the said shaft 12. This hopper 7 is sustained in working position by a superstructure 14 erected upon the framework 3.

An annular mortar 15 is placed upon the bed 2, and comprises a centrally-depressed portion and inclosing side walls, and is constructed of metal, which is cast in sections, having the opposing end portions flanged to receive bolts, by means of which the several sections are secured together. The bottom 16 of the mortar is heavy and sufficiently stout to withstand the action of the pulverizing devices, and its edge portions project slightly beyond the side walls to obtain an extended bearing upon the bed 2. The inner wall 17 extends upward at a slight angle, and is considerably higher than the opposing wall 18. An outwardly and upwardly inclined ledge 19 connects at its inner edge with the outer side wall 18 and forms a continuation thereof, and a wall 20 projects vertically from the outer edge of the said ledge 19. A slot or opening 21 is formed in the ledge 19, and provides an escape for the ore to the amalgam plate 22, placed opposite the respective section of the motor. A lip 23 projects outwardly and downwardly from the outer wall 18 and extends over the inner and upper edge of the amalgam plate. This lip prevents the waste of the ore by passing over the inner end of the amalgam plate 22. A cut-off 24 is provided to close the opening 21 when it is required to shut off the supply of ore from the mortar to the amalgam plate. This cut-off is supported beneath the ledge 19 by means of ribs 25, which are grooved on their opposing or inner sides for the said cut-offs to slide therein. A hook 27 is located at the outer edge of the cut-off 24 to serve as a means for operating the cut-off and as a means for supporting the cut-off when drawn out by engagement with the upper edge of the wall 20. A flange 26 is formed at each end of the mortar-sections, and bolts pass through these flanges to secure the mortar-sections together. An inner flange 28, corresponding to the outer flange 26, is provided at each end of the mortar-sections, and these flanges have openings for the passage of the fastening-bolts by means of which the sections are held together.

If desired, packing may be clamped between the opposing ends of the mortar-sections, whereby a close joint is obtained.

It must be understood that the sections of the mortar are similarly constructed and form arcs of a circle corresponding to the circumference of the completed mortar.

The cut-offs 24 and the milling-screens, hereinafter to be referred to, are formed on arcs of a circle corresponding to the curvature of the mortar-sections. The free milling-screens 29 are secured exterior to the ledge 19 in any desired manner and extend over the openings 21. The concentrating-screens 31 are located within the mortar and are fitted in rabbets 30, surrounding the openings 21, and are held in place by suitable means. By having the concentrating-screens fitting in rabbets the mortar has a smooth interior surface for the pulp to sweep over.

While any efficient and desirable means may be employed to secure the screens 29 and 31 in place, the provisions herein shown are preferred, because of the attendant simplicity in the assembling and constructing of the parts, and consist of bolts 32, passing through the ledge 19 and through the edge portions of the said screens, and having nuts 33 upon their projecting ends.

The distributing-hopper 6 is mounted upon the upper portion of the vertical shaft 4 and has a series of discharge-openings 34 in its bottom for the escape of the ore into the spouts 35, by means of which it is conveyed to various portions of the annular mortar. The sides bordering upon the openings 34 incline in opposite directions to prevent the lodgment of the ore thereon. The upper portion 36 flares outwardly to prevent interference thereof with the lower portion of the chute 8 and to obviate a splashing of the ore as it enters the distributing-hopper 6 from the said chute 8. Sprocket-teeth 37 are provided on the edge portion of the hopper 6, to be engaged by a sprocket-chain 38, by means of which motion is transmitted to the shaft 4. This sprocket-chain 38 passes around a sprocket-pulley 39 on a vertical shaft 40, having a band-pulley 41, which is driven from a band-pulley 42 on a counter-shaft 43 by means of a drive-belt 44, the counter-shaft 43 receiving its motion from a suitable source of power by means of a belt (not shown) passing around a band-pulley 45, mounted thereon. A drip-cup 46 is secured upon the upper end portion of the vertical shaft 4 immediately below the upper bearing to catch oil and other drippings and prevent the same entering the ore in the distributing-hopper 6. The spouts 35 incline outwardly and downwardly and terminate in vertical extensions 47 directly above the depressed portion of the annular mortar.

A deck 48 is located a short distance above the top of the bed 2 and inclines outwardly and downwardly from its middle point, and makes connection at its outer edge with the inner wall of the annular mortar. This deck is centrally apertured for the passage of the vertical shaft 4, and is preferably constructed of sheet metal, and forms a closure for the space comprised between the inner walls of the annular mortar. By having the deck sloping ore or other material lodging thereon gravitates toward the annular mortar, as will be readily understood. A pan 49 is located immediately beneath the elevated portion of the deck 48, and has a series of spouts 50 for the escape of ore or drippings, which may be caught by the said pan, and deliver the same into a circular trough 51, having outwardly-extending conveyers 52, which communicate at their outer ends with the annular mortar. Thus the drippings caught by the pan 49 pass into the trough 51 and thence to the mortar by means of the conveyers 52. The circular trough 51 is located in a lower plane than the pan 49, and is of larger diameter than the latter, and receives the drippings from the spouts 50, which project thereover.

The amalgam plates 22, one for each section of the mortar, incline outwardly and downwardly from their inner ends and terminate at their outer extremities directly above a trough 53 in the top side of the base or platform 1. These plates 22 have pendent lugs 54 at their inner ends to engage with a rod 55, secured upon an offset portion of the bed 2, by means of which a hinge or pivotal connection is had between the said plates and the bed. The outer ends of the plates are vertically adjustable to regulate the inclination of the said plates and the consequent passage of the ore thereover into the trough 53. A roller 56 is provided for each plate, and has journals at its ends eccentrically disposed and placed in slots 57 in vertical standards 58. By having the journals of the roller eccentric the outer end of the amalgam plate can be adjusted to a nicety by simply rotating the roller upon its journals.

It must be understood that the outer end portion of the amalgam plate rests upon and is supported by the roller 56. Hence when turning the latter the desired adjustment is attained. In order to retain the roller in the located position, it is formed with a series of flat faces 59, any one of which is brought opposite and in engagement with the amalgam plate, thereby preventing the accidental displacement of the roller from the located position. The slots 57 in the standards 58 are formed in one edge and incline upwardly, so as to retain the rollers in place when properly positioned. For a quick adjustment of the amalgam plates the rollers are shifted from one to the other of the slots 57, the fine adjustment being attained by turning the rollers upon their journals, as herein stated. There will be two standards 58 for each amalgam plate, and they will have registering slots 57 to receive the journals of the rollers supported thereby. The rollers may be turned upon their journals in any convenient manner and are provided at one end with a hand-wheel 60 for this purpose. The trough 53 is circular and gradually deepens from the receiving to the delivery end of the machine or apparatus, so as to convey the ore after it has been pulverized and treated upon the amalgam plates to the washing apparatus. A manhole 61 is formed in the bed 2 to admit of access to those parts of the mechanism located beneath the deck 48 and within the confines of the annular mortar. This manhole will be of such relative proportions and so disposed as not to weaken or in any wise detract from the strength of the bed 2.

A circular casting or hub 62 is mounted upon the shaft 4, immediately above the deck 48, and is provided in its peripheral edge at regular intervals apart with depressions 63, having outwardly-extending ears 64 to receive the inner ends of arms 65, mounted upon pivots or bolts 66, passing through registering openings 67 in the ears 64. Sockets 68 are formed at diametrically opposite points and receive the inner ends of arms 69, which are held rigidly therein against vertical and lateral displacement. The arms 65 and the parts connected therewith are of like construction. Hence a detailed description of one will suffice. An approximately T-shaped slot 70 is formed in the outer end of the arm 65 and receives the inner end portion of a spindle 71, carrying a stamp or pulverizing-wheel 72 on its outer end. A journal-box formed in two parts 73 74 is fitted in the slot 70 and has outer flanges 75, which overlap the sides of the arm 65, contiguous to the slot 70, and is held in place by bolts 76, passing through the flanges 75 and the portions of the arm 65 located between the said flanges. The spindle 71 is journaled in the said box and is reduced, so as to be held against longitudinal movement in the traveling of the arm 65. A casting 77 is mounted upon the outer portion of the spindle 71 and is flanged at its ends to be bolted to the pulverizing-wheel 72 and the flanged end of a sleeve 78, inclosing the end of the arm 65 and protecting the journal-box from the ore and dust.

Obviously the casting 77 may be an integral part of the sleeve 78, or the latter may be attached directly to the pulverizing-wheel 72. The sole function of the sleeve 78 is to form a housing for the journal-box and prevent the ore, dust, sand, and other foreign matter thereon from finding its way into the wearing parts and grinding out the latter in a comparatively short interval of time. The inner end of the sleeve is closed by a cap 79, formed of two parts, which are fitted about the arm 65 and held together by a clamping-band 80, sprung into a groove formed in the peripheral edge of the united parts. Each part of the cap has a handle 81 to facilitate the removal or the insertion of the cap within the open end of the sleeve 78. This cap prevents the entrance of foreign matter into the inner open end of the sleeve.

The pulverizing-wheel 72 has a series of sockets 82 in its peripheral edge, spaced at regular intervals apart and designed to receive the shanks 83 of shoes 84, by means of which the ore is pulverized and crushed, and these sockets taper to conform to the tapering shanks 83, so as to secure a close fit and prevent any vibratory movement of the shoes 84 in the operation of the pulverizing-wheel. Depressions 85 are formed in the edge of the wheel between the sockets 82, in order to secure ample clearance between the shoes 84 for the banking up of the ore when crushing and pulverizing the same.

The shoes 84 may be of chilled iron or hardened steel, so as to withstand the wearing action of the ore. The shoes are retained within the sockets by friction or in any desired manner, and are held from accidental displacement by keys 86, passing transversely through registering openings in the body of the wheel and through slots or oblong openings 86$^a$ in the shanks of the shoes. These keys may be bolts or pins of any desired shape common in the art for connecting and holding parts in fixed relation. Slots 87 extend transversely through the body of the wheel and are located opposite and intersect with the bottom portions of the sockets 82, so as to receive a wedge or tapering drift 87$^a$, when it is required to remove or dislodge a shoe from its socket for the purpose of repair or to be replaced by a new one. The sides of the shoes come flush with the sides of the wheel and the length between the sides corresponds to the distance between the vertical walls of the annular mortar, so that the pulverizing-wheel operates in the entire space comprised between the walls 17 and 18 of the mortar. To attain the best possible results, the outer ends of the shoes are curved, the curvature being of such relative pitch so that one end of the shoe is at a greater distance from the center of the pulverizing-wheel than the opposite end, thereby resulting in a pulverizing of the ore by a crushing action, as will be readily comprehended.

A drag 88 is attached to the outer end of the arm 69 by means of a short chain 89, which latter has adjustable connection with the said arm by means of a clip 90, having the usual binding-screw. This drag 88 is a metal plate having on its under face a series of ribs 91, which incline in opposite directions from the center outward, the inner ends of the ribs being spaced apart a sufficient distance for the escape of the ore from the ribs 91. The drag 88 may be used at such times only when it is desired to clean up. However, it may be advantageously employed at all times to centralize the ore within the mortar, and to this end it should be moved in such a direction that the ribs 91 will gather the ore from the sides of the mortar and move it to the center thereof. A flat steel brush 92 is adjustably connected with the outer end of the arm 69 and is intended to sweep over the concentrating-screens and cause the ore to pass through the openings therein. This brush has its lower edge conformed to the inclination or pitch of the concentrating-screens, and is of a width to extend entirely across and operate upon all portions of the said screens. In order to compensate for wear, this brush is vertically adjustable.

A circular frame 93 is located above the mortar and forms a support for a series of protectors, curtains, or sheets 94, the latter having hooks 95 at their upper edges to be engaged with the frame 93. These curtains or sheets will be formed from muslin, ducking, or any other fabric suitable for the purpose and will be provided in sufficient number, one for each section of the mortar. The lower edge portion of these curtains or sheets is hemmed to form a pocket for the reception of a bar 96, by means of which the lower ends of the sheets are weighted and held within the vertical portion 20 of the mortar. These sheets or curtains overlap at their edges, so as to maintain a close joint and prevent the escape of the ore, and in the operation of the apparatus are wet, so as to catch flying particles of the ore and cause the same to adhere thereto and be returned to the mortar when a sufficient quantity or mass has accumulated and is no longer capable of adhering to the sheets. Above the frame 93 is placed a corresponding circular frame 97, concentric with and of smaller diameter than the frame 93, and forms a support for a series of pulley-blocks 98, through which pass cords or ropes 99, attached at one end to the lower portion of the sheets or curtains, and reefed through eyelets provided on the said sheets, and having their outer end portions passing through pulley-blocks 100 and hitched to blocks 101, provided on the frame 3. By means of these cords or ropes 99 the sheets 94 can be raised and lowered as desired.

The concentrators will be provided in two sets which are disposed side by side in parallel relation, each set having a series of pans placed at different relative levels and adapted to be agitated or rocked to effect a settling and a concentrating of the ore. Inasmuch as the actuating mechanism will be precisely the same for each, a detailed description of one will be referred to only.

The upper concentrating-pans 102 are placed in alinement with the respective lower pans 103 and their delivery ends project a short distance over the receiving ends of the lower pans 103, so as to discharge the finer particles of ore therein. A screen 104 is placed in the bottom of the pan 102 near its delivery end for the escape of fine particles of ore into a tray 105, secured to the under side of the pan 102 opposite the screen 104. The tray 105 terminates in a spout 106, which projects into the pan 103 to discharge the finer particles of ore into the latter.

Immediately below each pan 102 is centrally disposed a longitudinal shaft 107, provided at intervals in its length with a series of eccentrics 108 to produce a vibratory movement of the pan, as will appear more fully later on. A band-pulley 109 at the end of the shaft 107 is connected by a belt 110 to a corresponding band-pulley 111 on a shaft 112, which latter receives its motion from the shaft 43 by a belt 113, passing around corresponding band-pulleys on the respective shafts 43 and 112. Arms 114 are hinged or pivotally connected at their upper ends to angle-irons 115, secured to the corners of the pan 102, and which have eccentric-receiving straps 116 at their lower ends for the reception of the eccentrics 108. These arms 114 are provided in pairs and the arms of each pair extend in opposite directions and are disposed in about the same plane to support the pan at opposite points. Rocker-bearings are centrally placed between the bottom of the pan and a cross-beam 117 of the framework, provided for supporting the pans and their actuating mechanism. These rocker-bearings comprise a lower plate 118, having an elevated socket 119, and a plate 120, having a tapering projection 121 to enter the socket 119 and rock therein, the socket and projection gradually widening from the apex toward the base in a transverse direction only, the sides being parallel and touching to prevent longitudinal movement of the pans. Springs 122 are interposed between the outer edge portions of the pan-bottom and the cross-beam 117 and form a yielding support and materially assist in giving to the pan its oscillatory movement.

The pans 103 are supported and oscillated in precisely the same manner and by the same means as the pans 102, the eccentrics being mounted upon a shaft 123, placed beneath the pan 103 and receiving motion from the shaft 107 by intermeshing gearing 124, consisting of similar pinions keyed upon the opposing ends of the respective shafts 107 and 123. Each of the pans is provided in its bottom with a series of openings closed by doors 125, which when closed come flush with the top side of the pan-bottom. These doors 125 are hinged at their inner ends and swing downward at their outer ends and are held closed by fastenings, which, as shown, consist of an iron 126, secured to the door and having a crank 127 mounted in its projecting end and adapted to have its threaded end 128 screwed into an internally-threaded plate 129, mortised into the bottom of the pan opposite the door-opening. By means of the crank 127 and the threaded plate 129 the door 125 can be forced shut and have its upper surface come flush with the top side of the pan-bottom. A chute 130 is located beneath each door 125 and inclines outwardly and downwardly from the rear side of the pan to discharge the ore to one side of the apparatus.

Transverse shafts 131 and 132, arranged over the delivery ends of the pans 102, have sprocket-cones 133 and 134, respectively, around which a sprocket-chain 135 passes. The shaft 132 is journaled in bearing-blocks 136, which are adjustable upon the framework of the apparatus and which are moved by means of a lever 137, secured upon one end of a rod 138 and having connection with the said bearing-blocks by means of links 139, said rod 138 having a ratchet-wheel 140, which is engaged by a pawl 141, by means of which the lever 137 is held in the located position. When it is required to change the relative speed of the shaft 132, the pawl 141 is disengaged from the ratchet-wheel 140, and the lever 137 is operated to bring the sprocket-cones 133 and 134 together to provide sufficient slack in the sprocket-chain 135 to admit of the latter being shifted from one set of sprocket-teeth to another of different relative size. After the adjustment is effected the lever 137 is operated to move the bearing-blocks 136 until the sprocket-chain 135 is sufficiently tightened, when the pawl 141 is engaged with the ratchet-wheel and the parts held in the required adjusted position. A gate 142 closes the rear end of the pan 102 and is steadied in its movements by means of a spring 143 of suitable construction. This gate 142 is hinged to the bottom of the concentrating-pan and has packing $142^a$ at its ends to form a close joint with the sides of the concentrating-pan, and this packing is held in place between metal straps $142^b$, secured to the opposite sides of the gate. A cord or chain 144 connects the gate with a drum 145 on the shaft 132. Hence when the shaft 132 is rotated in the proper direction so as to wind up the cord 144 the gate 142 will be raised at its free end, and when rotated in a reverse direction to slacken the said cord the said gate will close.

A sprocket-wheel 146 is mounted upon the shaft 131 and is operated by means of a sprocket-chain 147 from a sprocket-pinion 148, mounted upon a transverse shaft 149, and a corresponding sprocket-wheel 150 on the same shaft 131 is connected by a sprocket-chain 151 with a sprocket-wheel 152 on a transverse shaft 153, upon which latter is placed a sprocket-wheel 154 to transmit motion by means of a chain 155 to a sprocket-wheel 156 upon a transverse shaft 157, located over the rear portion of the concentrating-pan 103. This shaft 157 and its companion shaft 158 correspond with the shafts 131 and 132 and are similarly equipped and related to operate gates 159 at the rear ends of the concentrating-pans 103. The actuating mechanism for the gates 159 is a duplicate of that provided for operating the gates 142, and the previous description of the same will be sufficient, the corresponding parts being similarly indicated. A sprocket-wheel 160 is mounted upon the shaft 131 and has connection, by means of a sprocket-chain 161, with a sprocket-pinion 162 upon a vertical shaft 163, carrying a gear-wheel 164, which is in mesh with a worm-gear 165 on the shaft 149, upon which shaft is placed a sprocket-wheel 166, which is connected, by a chain 167, with a sprocket-wheel 168 upon a shaft 169, having at its opposite end a bevel-pinion 170 to mesh with a corresponding bevel-pinion 171 on a vertical shaft 172, which is provided with a sprocket-wheel 173, receiving its motion from a sprocket-wheel 174 by means of a sprocket-chain 175. A vertical shaft 176 has the sprocket-wheel 174 keyed thereto, as also a gear-wheel 177, which meshes with a worm-gear 178 upon a transverse shaft 179, having sprocket-wheels 180 and 181, which are connected by sprocket-chains 182 and 183, respectively, with sprocket-wheels 184 and 185 upon the shaft 112, thereby completing the mechanism by means of which the various parts are actuated. The sprocket-wheels 184 and 185 are adapted to be secured upon the shaft 112, so as to rotate therewith according as it is required to operate one or the other of the gates 142 or 159, and by shifting the relative position of the chains 135 the gates may be raised and lowered at the required rate of speed, as will be readily understood.

The delivery ends of the concentrating-pans 102 have inwardly-extending spouts 186, which terminate over a vertical spout 187, to carry off tailings and other refuse matter. A chute 188 conveys the ore from the trough 53 to the receiving ends of the concentrating-pans 102 and has branch portions 189, which extend to the respective pans 102. A gate 190 is located at the point of junction of the branches 189 with the main chute and is adapted to be turned either to the right or the left to open one or the other of the branches, so that the ore may be directed into the desired pan. When it is required to supply both pans, the gate 190 is adjusted to an intermediate position, so that the ore may pass from the main chute through both branches 189 into both concentrating-pans.

A pipe 191 communicates at one end with a suitable source or fountain of water and extends a short distance parallel with the pans 102. A branch pipe 192 establishes communication between the mortar and the main pipe 191, so as to supply water in sufficient quantity to the mortar in the pulverizing of the ore. Spray-pipes 193 are located over the pans 102 and are connected by branch pipes 194 with the main pipe 191, so as to supply water to the ore in the concentrating-pans 102.

It will be understood that both sets of concentrating-pans may be used together or separately, as desired, and that the actuating mechanism will be so constructed as to be thrown in and out of gear to operate the parts coöperating with the sets of pans performing efficient work.

In order to adapt the invention for treating dry ore, the construction shown in Fig. 32 has been devised, and the parts shown therein are substantially the same as the corresponding parts shown in the other figures, with the exception of the curtains or sheets 94, which are replaced by protectors or doors 195, the latter adapted to slide vertically between posts 196 and formed at their ends with tongues to operate in grooves provided in the inner sides of the said posts 196, by means of which the said doors are steadied and guided in their movements. The lower edges of the doors are grooved, as shown at 197, and these grooves receive the upper edge portion of the outer vertical wall 20 of the mortar. The means for raising and lowering the doors 195 will be substantially the same as those designed for operating the sheets or curtains 94, the blocks 101 for securing the free ends of the cords or ropes 99 being attached to the vertical posts 196. The door 195 immediately below the sprocket-chain 38 is incapable of vertical movement by reason of the position of the said sprocket-chain 38, and in order to provide for the removal of the said door the latter is rabbeted at its edges to fit corresponding rabbets 198 in the inner sides of the adjacent posts opposite the ends of the said door. Any door of the series can be similarly constructed to provide for its removal where an upper part would interfere with the vertical movements of the said door. A deck 199 is arranged above the mortar and corresponds with the lower deck 48 and is centrally apertured to receive the distributing-hopper 6. The upper ends of the doors 195 have inwardly-extending flanges 200, which overlap the edge portion of the deck 199, so as to provide a close joint therewith and prevent the escape of the dust incident to the treating of dry ore. An imperforate plate 201 replaces the concentrating-screen 31 of each mortar-section, so as to effectually close the openings 21 in the ledge 19 and prevent the escape of the pulverized ore. A suction-pipe 202, suitably connected with the mortar, is provided for conveying the dry pulverized ore to a suitable point for concentration and separation in any desired way.

The stamp or pulverizing wheel 72 (shown in Figs. 35 and 36) is not provided with detachable shoes, the crushing portions 203 being integrally formed therewith by preference, although this is not absolutely necessary. The arm 65, provided at its outer end with the pulverizing-wheel, is connected with a coupling 204 by means of a binding-screw 205, and this coupling 204 is formed of similar parts having outwardly-extending flanges, which are bolted together. A short shaft 206 has its inner end inserted within the coupling 204 and held in place by a binding-screw 207, and its outer portion extends through a boss 208, secured to the inner side of the pulverizing-wheel, and through the latter, its outer end being threaded and provided with a nut 209, by means of which the pulverizing-wheel is retained upon the outer portion of the said shaft 206. A cap 210 is secured to the outer side of the pulverizing-wheel and incloses the projecting end of the shaft 206 and the nut 209, and this cap forms an oil-chamber, and lubricant is passed into the latter through an opening in the cap, which is closed by means of a plug 211. The shaft 206 is formed between its ends with an annular flange 212, which is held between the outer end of the boss 208 and a packing-gland 213, which latter is secured to the outer flanged end of the boss 208 by bolts 214, extending through registering openings provided in the flanges of the said boss and gland.

It will be understood that there may be as many concentrating-pans to a set as desired and that the actuating mechanism herein specified may be duplicated for additional concentrating-pans. Hence in adapting ore-concentrating apparatus to meet the various requirements according to the nature of the ore to be worked it will be understood that changes in the form, proportion, and the minor details of construction may be resorted to without departing from the principle or sacrificing any of the advantages of this invention.

Having thus described the invention, what is claimed as new is—

1. An ore-treating apparatus comprising a mortar having a series of discharge-openings at intervals in its sides, a trough surronding the mortar and gradually deepening toward a point of discharge, amalgam plates located opposite the discharge-openings of the mortar to receive the crushed ore therefrom and direct it into the surrounding trough, pulverizers for crushing the ore in the mortar, parallel concentrating-pans, a chute communicating with the lowest point of the aforesaid trough and having branches leading to the respective concentrating-pans, and a gate for controlling the discharge through either or both of the branches of the chute, substantially as and for the purpose set forth.

2. In an apparatus for treating ore, the combination with a series of concentrating-pans disposed in parallel relation, each having a gate at its delivery end, of a drum operatively connected with each gate, and variable-actuating mechanism for the several drums, whereby the gates can be moved at the required rate of speed, as and for the purpose set forth.

3. In an ore-treating apparatus, the combination with a concentrating-pan, and a gate to control the delivery end thereof, of a drum operatively connected with the said gate to raise the same, a mechanism to operate the drum at the required speed, and a spring connected with the gate to steady the movements thereof, substantially as set forth.

4. In an ore-treating apparatus, the combination of concentrating-pans placed in parallel relation, gates for closing the delivery ends of the pans, a transverse shaft having drums operatively connected with the gates, a second transverse shaft suitably connected with a suitable source of power, speed-cones inversely disposed upon the two shafts, and a belt connecting the speed-cones and adapted to be moved thereon to vary the speed of the shaft carrying the drums, whereby the gates can be moved at the required speed to attain the desired results, substantially as set forth.

5. In an ore-concentrating apparatus, the combination of the concentrating-pans, gates for closing the delivery ends of the pans, a shaft provided with drums operatively connected with the gates, a second transverse shaft driven from a suitable source of power at a given rate of speed, sprocket-cones inversely disposed upon the two shafts, a sprocket-chain for connecting the said sprocket-cones, and means for moving one of the shafts relatively to the other to admit of the position of the said sprocket-chain being changed, whereby the gates are moved at the required speed, substantially as set forth.

6. In an ore-treating apparatus, the combination of two sets of concentrating-pans arranged in parallel relation and at different relative heights, a gate for the delivery end of each pan, independent transverse shafts driven from a source of power common to each, means for throwing either or both of the said shafts out of gear, drums mounted upon the shafts and operatively connected with the respective gates, a variable-speed gearing interposed between the shafts and the driving mechanism, whereby the shafts may be rotated at the required speed to move the gates more or less rapidly as required, substantially as set forth.

7. In an ore-treating apparatus, the combination with the concentrating-pans and gates at the delivery end thereof, of a transverse shaft journaled in movable bearings and having drums operatively connected with the gates, a second shaft, speed-cones mounted in inverse order upon the two shafts and connected by a drive-chain, a rod operatively connected with the movable bearings and provided with an operating-lever, and means for holding the said lever in a fixed relative position, substantially as and for the purpose set forth.

8. In an ore-treating apparatus, the combination of a frame, a concentrating-pan, a rocker-bearing interposed between the frame and pan and comprising similar plates formed, respectively, with a tapering projection and a protruding socket to admit of the pan oscillating laterally and secure it against any longitudinal movement, a shaft parallel with the pan and alining vertically with the rocker-bearing, pairs of eccentrics secured at intervals in the length of the shaft, and arms mounted upon the eccentrics at one end and having pivotal connection at their other end with the sides of the pan, substantially as and for the purpose set forth.

9. In an ore-treating apparatus, the combination with a concentrating-pan mounted upon a centrally-disposed rocker-bearing, of supporting-springs located beneath the concentrating-pan and upon opposite sides of the rocker-bearing, a shaft disposed about centrally below the concentrating-pan, and arms having eccentric connection at their lower ends with the said shaft and diverging and having pivotal connection at their upper ends with the pan upon opposite sides of the aforesaid rocker-bearing, substantially as described for the purpose specified.

10. In an ore-treating apparatus, the combination with a concentrating-pan and a centrally-disposed shaft having eccentrics mounted thereon, of arms disposed in pairs and extending in opposite directions, and having pivotal connections with the opposite sides of the pan and mounted upon the said eccentrics, whereby the pan is given a rocking or oscillatory movement, substantially as set forth.

11. In an ore-treating apparatus, the combination with a concentrating-pan and a shaft having eccentrics mounted thereon, of arms provided in pairs and mounted upon the said eccentrics, and angle-irons secured to the corners of the pan and having pivotal connection with the said arms, substantially as set forth.

12. In an ore-treating apparatus, the combination with a concentrating-pan provided with an opening in its bottom, of a door adapted to close the said opening and having an iron projecting beyond one edge, a crank mounted in the projecting end of the said iron and having a threaded portion, and a plate having a threaded opening to receive the threaded portion of the crank and secured to the pan-bottom to one side of the opening therein, substantially as set forth.

13. The combination with a concentrating-pan having an opening in its bottom, of a door hinged at one side to the opening and adapted to come flush with the top side of the pan-bottom, and having an iron projecting beyond its opposite edge, a crank mounted in the projecting end of the iron and having a threaded portion, a plate secured in a mortise in the pan-bottom and having a threaded opening to receive the threaded portion of the said crank, substantially as specified.

14. In an ore-treating apparatus, the combination with a concentrating-pan having a series of openings at intervals in the length of its bottom, a shaft located immediately below the concentrating-pan, and connections between the shaft and concentrating-pan for vibrating the latter, of a series of chutes attached to the bottom of the pan near a side thereof and to one side of the openings, and extending across the latter to the opposite side of the pan, and doors for normally closing the aforesaid openings and hinged to the bottom of the pan at the side of the openings adjacent to the upper ends of the chutes, and adapted to open downward upon the chutes, substantially as set forth.

15. In an ore-treating apparatus, the combination of alining concentrating-pans disposed at different elevations, a laterally-extending chute at the delivery end of the higher pan, a screen interposed in the length of the bottom of the pan adjacent to the said chute, a gate normally inclining to the vertical and having its lower edge touching the bottom of the pan in advance of the screen, means for positively adjusting the gate at its upper edge in an arcuate path, and a shallow tray secured to the higher pan below the screen and having a spout extending into the receiving end of the lower pan, substantially as shown for the purpose described.

16. In an ore-concentrating apparatus, the combination of two sets of concentrating-pans disposed in parallelism, each set comprising pans placed in a straight line and arranged at different elevations, inwardly-extending chutes 186 at the delivery end of the higher pans, a spout 187 to receive the tailings from the said chutes, a screen in the bottom of each of the higher pans in advance of the chutes, gates disposed in front of the screens, means for positively adjusting the gates, and shallow trays secured to the higher pans and arranged below the said screens, and extending into the receiving ends of the lower pans, substantially as shown and described.

17. In an ore-treating apparatus, the combination of two sets of concentrating-pans arranged in parallel relation, each set comprising two pans arranged at different relative levels, the delivery ends of the higher pans having inwardly-extending chutes, a spout common to the said chutes, gates at the delivery ends of the higher pans, and screens exterior to the said gates and closing openings in the pan-bottoms, and shallow trays placed opposite the said screens and extending over the receiving ends of the said lower concentrating-pans, substantially as and for the purpose set forth.

18. An ore pulverizing and crushing wheel having sockets in its periphery and having depressions between the sockets and hardened shoes provided with shank portions which are fitted and secured in the said sockets, the front and rear edges of the shoes forming prolongations of the adjacent walls of the depressions, substantially as set forth.

19. In combination, an ore-crushing wheel, a supporting-arm having a slot, a spindle journaled in the said slot of the supporting-arm, and a sleeve encircling the bearing formed between the said spindle and the supporting-arm, substantially as set forth.

20. In combination, an ore crushing and pulverizing wheel, a supporting-arm, a journal-box secured to the supporting-arm, a spindle bearing the crushing-wheel and mounted in the said journal-box, and a sleeve encircling the said journal-box, substantially as and for the purpose set forth.

21. In combination, an ore crushing and pulverizing wheel, a supporting-arm therefor, a spindle journaled in the said supporting-arm and having the ore-crushing wheel mounted thereon, a sleeve protecting the bearing formed between the spindle and the supporting-arm, and a cap-plate closing the inner end of the sleeve, and comprising two parts which are adapted to be fitted upon the supporting-arm and within the open end of the sleeve, substantially as set forth.

22. In combination, an ore crushing and pulverizing wheel, a supporting-arm therefor, a spindle journaled to the supporting-arm and carrying the crushing-wheel, a sleeve encircling the bearing between the spindle and the supporting-arm, and a cap-plate closing the inner end of the sleeve, and formed of two parts which have a groove in their peripheral edge into which is sprung a clamping-band, and which have handles, substantially as and for the purpose set forth.

23. In combination, an ore crushing and pulverizing wheel, a supporting-arm having an approximately T-shaped slot in its outer end, a journal-box formed in two parts and secured to the slotted end of the arm, and a spindle carrying the crushing-wheel and having a reduced portion which is mounted in the said journal-box, substantially as set forth.

24. In combination, an annular mortar having an outwardly-extending sloping ledge provided with openings which are closed by screens, a traveling arm, a drag having adjustable attachment with the arm and adapted to operate in the said mortar, and a brush having adjustable connection with and carried by the arm and adapted to operate on the said screens, substantially as set forth.

25. An annular mortar constructed of cast-metal sections which are flanged and abut at their ends, each section comprising a bottom, inner and outer walls, the inner wall inclining and being higher than the outer wall, an inclined ledge extending from the outer wall and having an opening to receive a screen, and having guides formed in the flanges at the ends of the ledge to receive a cut-off, and a vertical wall at the outer edge of the ledge extending above the plane of the top edge of the inner wall, substantially as and for the purpose set forth.

26. In an ore-treating apparatus, the combination of an annular mortar constructed of a series of cast-metal sections which are flanged and abut at their ends, each section comprising a bottom, inner and outer walls, the inner wall inclining and being higher than the outer wall, an outwardly and upwardly inclined ledge having an opening to receive a screen, and having guides formed in the flanges at the ends of the ledge to receive a cut-off, a vertical wall at the outer edge of the ledge, and a lip below the ledge projecting outwardly and downwardly from the outer wall to receive an amalgam plate, substantially as and for the purpose set forth.

27. In an ore-treating apparatus, the combination with an annular mortar having discharge-openings, of amalgam plates located opposite the said discharge-openings, and having depending lugs which are notched in their lower edges, a rod exterior to the mortar and adapted to enter the notched edges of the said lugs, and means for vertically adjusting the outer ends of the amalgam plates, substantially as specified.

28. In an ore-treating apparatus, the combination with a mortar having discharge-openings, of amalgam plates located opposite the discharge-openings and pivotally supported at their inner ends, standards having a vertical series of slots and rollers having adjustable connection vertically with the standards and having eccentric journals and forming supports for the outer ends of the said amalgam plates, substantially as set forth.

29. In an ore-treating apparatus, the combination of a mortar having lateral discharge-openings, a series of amalgam plates located opposite the discharge-openings, a pair of standards for each amalgam plate, having a series of notches in their edges, rollers having eccentric journals and adapted to be supported in any one of the said notches, and provided with a plurality of sides, and means for turning the rollers on their journals, whereby the amalgam plates can be adjusted to a nicety, substantially as set forth.

30. An annular mortar for ore-treating apparatus, having an outwardly-extending ledge provided with openings at intervals, in combination with concentrating-screens secured to the top side of the ledge above the openings, free-milling screens attached to the ledge below the openings, and intermediate cut-offs operating below the ledge and above the free-milling screens, substantially as and for the purpose set forth.

31. An annular mortar for ore-treating apparatus, comprising a series of sections, each section having flanged ends, an outwardly-extending ledge having an opening, and ribs at the ends of the opening, in combination with a concentrating-screen placed above each opening, a free-milling screen located beneath the opening and against the said ribs, means for securing the two screens to the ledge, and a cut-off adapted to operate over the free-milling screen and between the ribs, substantially as and for the purpose set forth.

32. In combination, an annular mortar, a deck closing the space between the inner walls of the mortar, a vertical shaft passing through the central part of the deck, and a drip-trough arranged beneath the deck and provided with conveyers communicating with the mortar, substantially as set forth.

33. In combination, an annular mortar, a deck closing the space between the inner walls thereof, a vertical shaft extending through the central part of the deck, a drip-pan attached to and moving with the shaft, and having spouts, an annular trough adapted to receive the drippings from the said spouts, and conveyers connecting the circular trough with the mortar to convey the drippings to the latter, substantially as set forth.

34. The combination with a mortar and ore crushing and pulverizing devices, of a protector, closing in the sides of the mortar formed of movable sections, substantially as described for the purpose set forth.

35. The combination with a mortar and ore crushing and pulverizing devices, of protectors, closing in the sides of the mortar, and hoisting-tackle operatively connected with the said protectors, for elevating the same, substantially as specified.

36. The combination with an annular mortar and ore crushing and pulverizing devices operating therein, of a circular frame supported above the mortar, a series of sheets or curtains, suspended from the said frame, a second circular frame of less diameter than, and supported above the first-mentioned frame, and hoisting-tackle having connection with the upper frame and operatively connected with the sheets, or curtains, to raise the latter, substantially as set forth.

37. An ore-treating apparatus comprising a concentrating mechanism, a pulverizing and crushing means comprising an annular mortar having an outwardly-extending ledge provided at intervals in its length with discharge-openings, amalgam plates located opposite the said discharge-openings, an annular trough to receive the ore from the amalgam plates, and gradually deepening toward the delivery end, and a chute connecting with the delivery end of the trough, and provided with branch portions and a controlling-gate, and adapted to deliver the ore to the concentrating mechanism, substantially as set forth.

38. An ore-treating apparatus comprising a base having an annular trough and an elevated bed, an annular mortar mounted upon the bed and having an outwardly-extending ledge provided with discharge-openings, circular ore crushing and pulverizing devices operating in the mortar, a vertical shaft having a distributing-hopper provided with spouts to convey the ore to different parts of the mortar, a sheet, or curtain, inclosing the sides of the mortar, amalgam plates to receive the ore from the mortar and deliver the same into the annular trough in the base, two sets of concentrating-pans provided with gates at their delivery ends, actuating mechanism for the said gates, and provisions for rocking or oscillating, the said concentrating-pans, substantially as described for the purpose specified.

In testimony that I claim the foregoing as my own I have hereto affixed my signature in the presence of two witnesses.

JOHN McKINNON.

Witnesses:
E. LEWIS,
WILL A. LEWIS.